April 4, 1961 J. PETTAVEL 2,977,846
OPTICAL PROJECTION APPARATUS
Filed Sept. 8, 1959 4 Sheets-Sheet 1

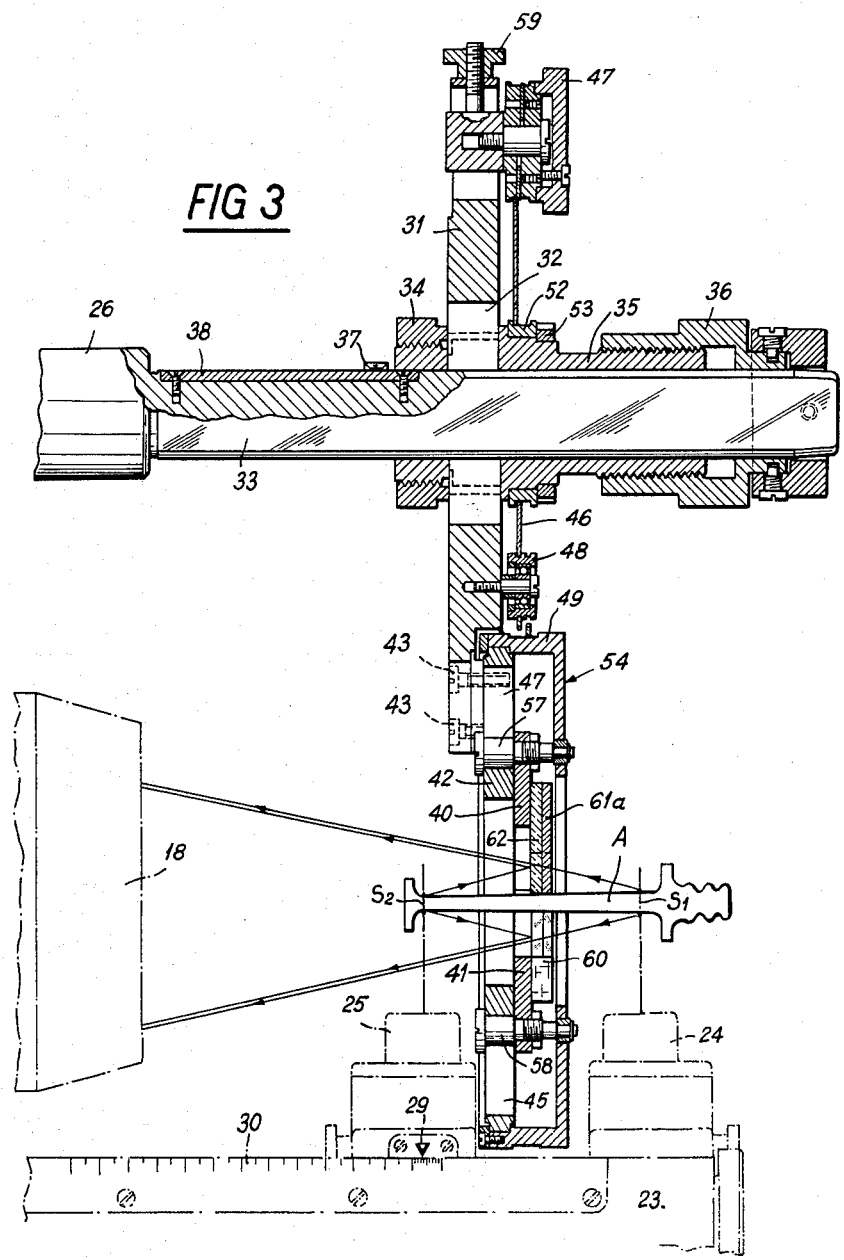

United States Patent Office 2,977,846
Patented Apr. 4, 1961

2,977,846

OPTICAL PROJECTION APPARATUS

Jacques Pettavel, Geneva, Switzerland, assignor to Societe Genevoise d'Instruments de Physique, Geneva, Switzerland, a firm of Switzerland Filed Sept. 8, 1959, Ser. No. 838,704

Claims priority, application Switzerland Sept. 29, 1958

2 Claims. (Cl. 88—24)

The present invention has as its subject a piece of optical apparatus with which it is possible to project simultaneously on to a screen the profiles of at least two plane sections of a three-dimensional body of complex shape, and, more particularly, of a turbine blade, this optical apparatus including a set of lighting equipment which picks out on the said body the profiles of at least two sections which are to be examined, a reflector with a support and several plane mirrors which, in the plane of one of the sections, form a virtual image of the other section's profile, and an objective, which is focussed on this plane and which projects on to the said screen an image of the profiles of these sections.

This apparatus is characterised by the fact that the reflector includes magnetic fixing attachments which make it possible to fix the mirrors detachably on the said support in positions selected arbitrarily.

The invention will now be further described with reference to the accompanying drawings which, for the purpose of example, represent one form of execution of the subject of the invention and in which:

Fig. 3 is a section view along the line III—III of Figure 2;

Figure 1:
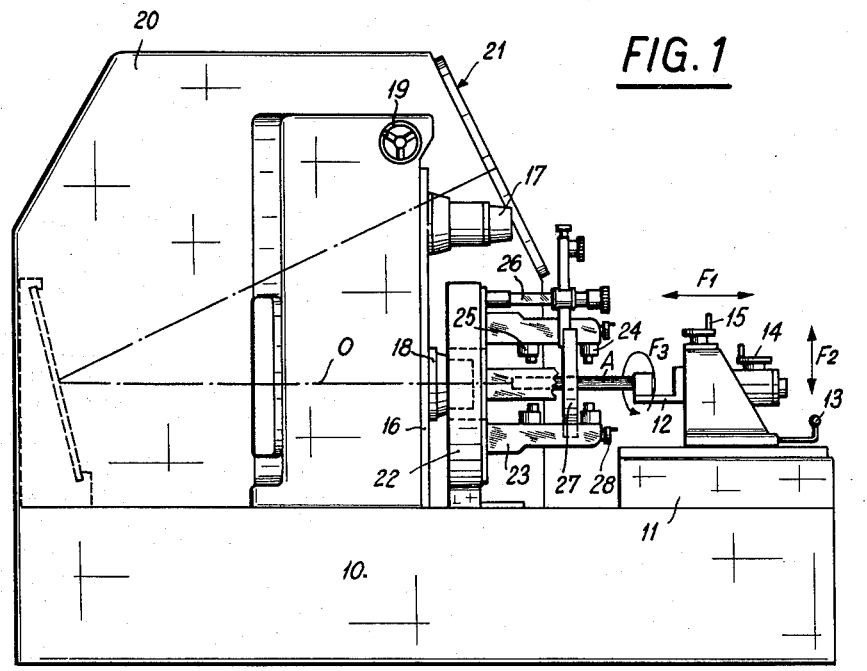
Fig. 1 is a profile view of the apparatus.

The apparatus represented is made up of a frame 10, a stationary table 11, a support 12 holding the object being examined—if needs be a turbine blade A—which is mounted on the table 11 in such a way as to be capable of being shifted lineally in the direction of the arrows $F_1$ and $F_2$ and rotationally in the direction of the arrow $F_3$ by means of a handle 13 and two cranks 14 and 15, a vertical slideway 16 along which two retractable objectives 17 and 18 can be shifted with the aid of a handwheel 19, a casing 20 in which is housed an optical system, the final component of which is a screen 21, and, lastly, a support 22 on which are mounted, on the one hand, a piece of lighting equipment comprising, arranged circularwise around the blade A, six projection lamps 23 each of which is equipped with a lamp 70 and two objectives 24 and 25, and, on the other hand, a bracket 26 carrying a reflector 27.

The objectives 24 and 25 (Figure 5) are designed to project on to the blade A two beams of light picking out the profiles $S_1$ and $S_2$ which are to be examined. The beam of light emanating from each of the filaments 71 of the lamps 70 passes through a condenser 72 and two prisms 73 and 74 which deflect one half into the optical axis of the objective 24 and the other half into that of the objective 25. Prior to reaching these two objectives the two beams are cut into by two drop diaphragms 75 which fix the width of the lines of light formed on the body A. The width of these lines may be modified by means of fine adjustment screws 76 which enable the positions of the moving blades, and of these diaphragms to be regulated.

The objectives 24 are attached to the frames 77 holding the lamps 23, whilst the objectives 25, whose position determines the position of the section $S_2$, are capable of being displaced in a direction parallel to the optical axis O by means of cranks 28, screws 78 and nuts 79. The axial position of the objectives 25 can be marked off exactly (Figure 3) by a pointer 29 and a graduated scale 30. The objectives are joined to the frames 77 by the bellows 80 and 81.

The function of the reflector 27 is to form, in the plane of the section $S_1$, a virtual image of the profile of the section $S_2$ such that the objective 18, which is focussed on the plane of the section $S_1$, projects on the screen 21 two superposed images of the sections $S_1$ and $S_2$.

Figure 4:
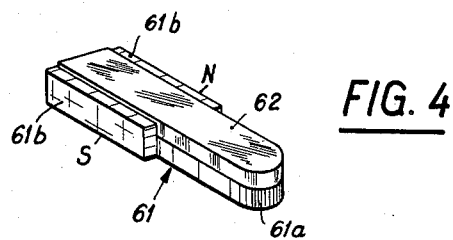
Fig. 4 is a perspective view of one mirror of the reflector.
Figure 2:
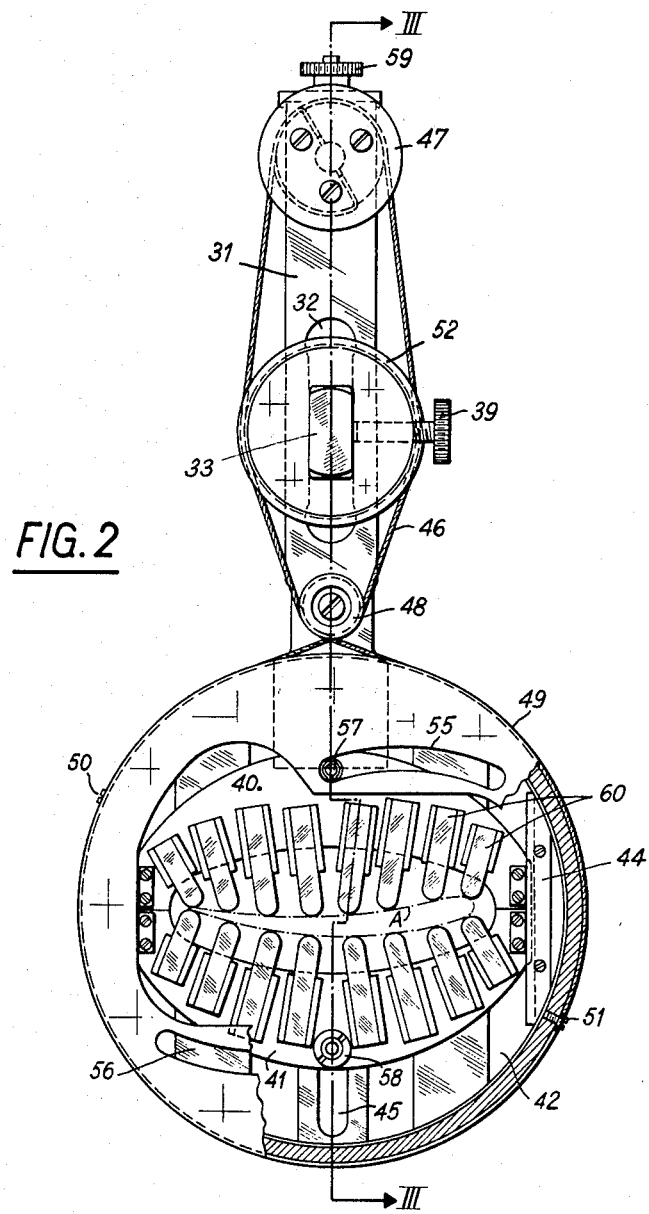
Fig. 2 is a front view of the reflector.

This reflector—which constitutes the part of the apparatus which can be considered as being original—is represented in detail in Figures 2 and 4. It comprises a vertical supporter bar 31 which has an elongated opening 32 which is traversed by a bearing piece 33—of rectangular section—of the arm 26. This bar 31 can be moved up and down within the limits of the opening 32, and locked in the position desired, by means of a tapped collar 34 which screws on a thread on a sleeve 35 which fits easily on the bearing piece 33. This sleeve 35 is itself able to be moved along the bearing 33 by means of a micrometer device which comprises an axially stationary nut 36 which screws on a second threading of the sleeve 35. The axial position of the latter may be fixed with precision by means of a pointer 37 and a graduated scale 38. There is a screw 39 which enables the sleeve 35 to be locked on the bearing 33.

The reflector 27 further contains two flat jaws 40 and 41 which slide vertically on a flanged circular plate 42 which is attached to the bar 31 by screws 43. These jaws, and the plate 42 too, are shaped so as to allow the blade A to pass through. The guide for the jaws 40 and 41 is provided by two lateral slides 44 mounted on the plate 42, and by two elongated apertures 45 provided in the latter's centre web.

The jaws 40 and 41 can be shifted simultaneously in the reverse direction by means of an arrangement comprising a cable 46 wound on a control drum 47, a return pulley 48, and a drum 49 which is rotationally mounted on the plate 42. The two ends 50 and 51 of the cable 46, which, in addition, runs in a groove of a collar 52 attached to the body of the sleeve 35 by a nut 53, are fastened to the drum 49. The latter's front plate 54 has two openings 55 and 56 in which are guided two pins 57 and 58 attached respectively to the jaws 40 and 41. These two pins are, moreover, engaged in the guide holes 45. Thus, the rotation of the control drum 47 has the effect of bringing the jaws 40 and 41 closer together or taking them farther apart. A screw adjustment 59 enables the tension of the cable 46 to be adjusted.

Lastly, the reflector 27 includes a series of flat mirrors 60 of elongated shape, their forward edges being rounded over, and each being constituted (Fig. 4) by a magnet 61 and a plate of polished glass 62. Each magnet 61 is formed of a sole-piece 61a and two side pieces 61b which take up about half the length of the sole-piece and constitute the poles of the magnet. The glass plate 62, which has the same shape as the sole-piece 61a, is encased between the poles 61b. These latter fit so as to make a shrink fit on the surface of the glass plate 62 in such a way that the mirrors can be attached magnetically on the jaws 40 and 41 of the reflector, without there being any mechanical contact between these latter and the poles. In this way the mirrors can easily be moved on the jaws or removed from them.

The apparatus is regulated in the following manner: The axis of the blade A is made to coincide with the optical axis O, then the position of the reflector is adjusted, its jaws having first of all been brought together as close as possible so that the blade is located approximately in the middle of the latter, and the reflector about half-way from the sections $S_1$ and $S_2$. The next job is to adjust the arms 23 radially, and the objectives 25 radially too, after which the mirrors 60 are placed on the jaws 40 and 41 in such a way that the light intensities of the beam reflected by the reflector, and the beam passing between the mirrors, shall be fairly equal, and that the forward edges of the mirrors shall be touching the surface of the blade. Lastly, after the two jaws have been gently moved away from each other, the reflector's axial position is given a final adjustment so as to ensure that its plane of reflection is situated at an equal distance exactly from the sections $S_1$ and $S_2$.

When all this has been done, the objective 18 can be focussed on the plane of the section $S_1$ in order to produce on the screen 21, two images of the profiles of the sections $S_1$ and $S_2$.

The main advantage of the reflector as described resides in the fact that it is possible for it to be adapted instantaneously to an object of any shape whatever, for the mirrors to be arranged so as to obtain the best light yield, to touch up without difficulty the position of each of them when the position of the moving section is altered, and lastly, for the mirrors to be replaced individually in case of need.

It is obvious that the invention is not limited to that which is represented in the drawing.

In particular, the diaphragms 75 could be replaced by two thin strips of transparent material placed side by side and of different colour, the borderline, on the object, between the two colours, producing the profile which is to be examined.

Figure 5:
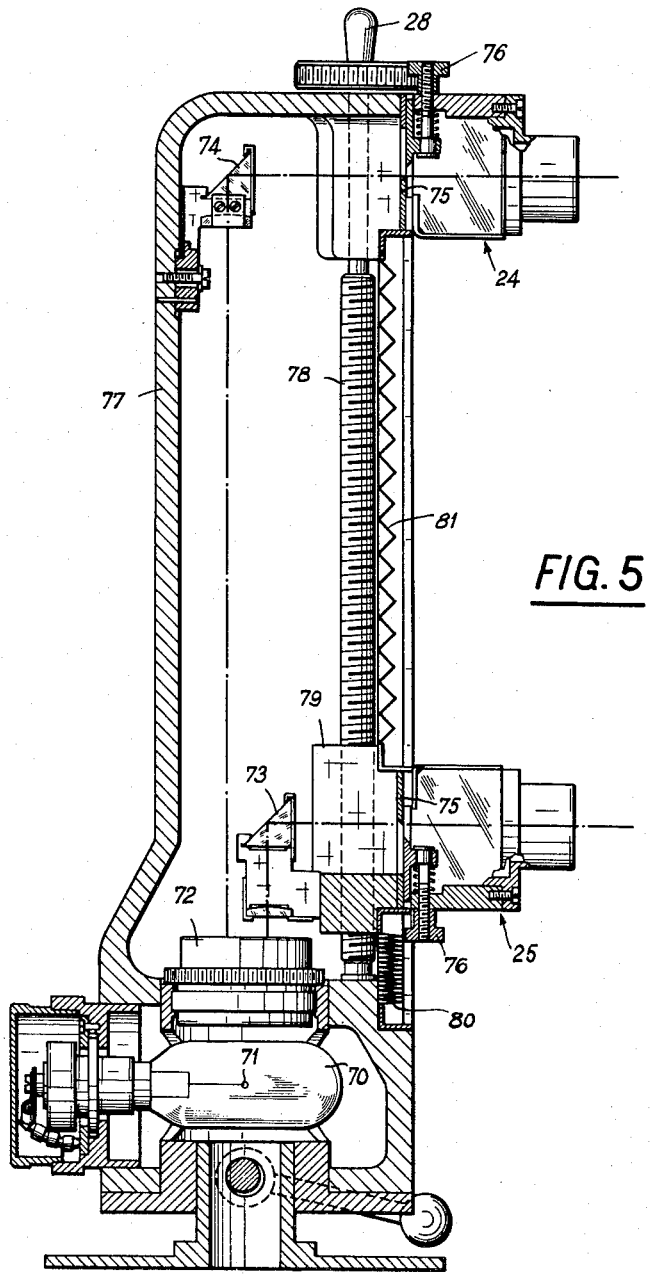
Fig. 5 is an axial section of a projection lamp in the lighting equipment.

It is also possible, instead of the lighting equipment as illustrated in Fig. 5 in the drawing, to make use of that which is represented in Swiss Patent No. 307,219.

What I claim is:

1. In an optical apparatus for simultaneously illuminating the outlines of two parallel planes of a three-dimensional body including a support for said body, means carried by said support for illuminating simultaneously said outlines and a common screen on which the image of said outlines are superposed, the provision of two flat jaws carried adjustably by the support and extending in a common plane parallel with said parallel planes at mid-distance between the latter to either side of the location of the three-dimensional body with a large clearance between them and the latter and two series of elongated flat mirrors carried by said jaws respectively to face one of the first-mentioned parallel planes and adapted to extend over the clearance between the jaws into substantial contact with the three-dimensional body, each mirror including a flat glass member lying in contacting relationship with the corresponding jaw and adapted to form a virtual image of the illuminated outline in said first-mentioned plane in the other first-mentioned plane in superposition with the image of the illuminated outline in said other first-mentioned plane and a magnet carrying the glass member on the side facing away from the jaw and the poles of which extend into close proximity with the jaw to ensure magnetic adherence of the mirror to the corresponding jaw and an objective system collecting the light rays produced by the superposed images and focusing final images of the latter on the common screen.

2. In an optical apparatus for simultaneously illuminating the outlines of two parallel planes of a three-dimensional body including a support for said body, means carried by said support for illuminating simultaneously said profiles and a common screen on which the images of said outlines are superposed, the provision of two flat jaws carried adjustably by the support and extending in a common plane parallel with said parallel planes at mid-distance between the latter to either side of the location of the three-dimensional body with a large clearance between them and the latter and two series of elongated flat mirrors carried by said jaws respectively to face one of the first-mentioned parallel planes and adapted to extend over the clearance between the jaws into substantial contact with the three-dimensional body, each mirror including a flat glass member lying in contacting relationship with the corresponding jaw and adapted to form a virtual image of the illuminated outline in said one first-mentioned plane in the other first-mentioned plane in superposition with the image of the illuminated outline in said other first-mentioned plane and a magnet constituted by a shoe extending partly over the glass member on the side facing away from the jaw and pole-pieces rigid with the shoe, extending over the sides of the glass member short of the end thereof facing the three-dimensional body and having their terminal edges facing the jaw lying at a slight distance from the latter to ensure magnetic adherence of the mirror to the corresponding jaw and an objective system collecting the light rays produced by the superposed images and focusing final images of the latter on the common screen References Cited in the file of this patent

UNITED STATES PATENTS

| 2,741,153 | Reason et al. | Apr. 10, 1956 |

FOREIGN PATENTS

| 724,562 | Great Britain | Feb. 23, 1955 |
| 326,227 | Switzerland | Jan. 31, 1958 |